(12) United States Patent
Wenzel et al.

(10) Patent No.: US 10,315,368 B2
(45) Date of Patent: Jun. 11, 2019

(54) FORMING TOOL WITH INTEGRAL CUTTING FOR COMPOSITE MATERIAL

(71) Applicant: Dow Global Technologies LLC, Midland, MI (US)

(72) Inventors: Jeffrey D. Wenzel, Saginaw, MI (US); Jay M. Tudor, Midland, MI (US); Dev Barpanda, Midland, MI (US); Scott R. Kaleyta, Saginaw, MI (US)

(73) Assignee: DOW GLOBAL TECHNOLOGIES LLC, Midland, MA (US)

( * ) Notice: Subject to any disclaimer, the term of this patent is extended or adjusted under 35 U.S.C. 154(b) by 411 days.

(21) Appl. No.: 14/783,241

(22) PCT Filed: Apr. 22, 2014

(86) PCT No.: PCT/US2014/034886
§ 371 (c)(1),
(2) Date: Oct. 8, 2015

(87) PCT Pub. No.: WO2014/182429
PCT Pub. Date: Nov. 13, 2014

(65) Prior Publication Data
US 2016/0046086 A1 Feb. 18, 2016

Related U.S. Application Data

(60) Provisional application No. 61/819,683, filed on May 6, 2013.

(51) Int. Cl.
*B29C 70/54* (2006.01)
*B29C 70/46* (2006.01)
*B29C 70/56* (2006.01)
*B29C 51/08* (2006.01)
(Continued)

(52) U.S. Cl.
CPC .......... *B29C 70/545* (2013.01); *B29C 51/082* (2013.01); *B29C 51/32* (2013.01);
(Continued)

(58) Field of Classification Search
CPC ...................................................... B29C 51/32
(Continued)

(56) References Cited

U.S. PATENT DOCUMENTS 4,228,121 A * 10/1980 Meadors ............... B29C 51/082
264/291
4,243,456 A * 1/1981 Cesano ................. B29C 51/082
156/212
(Continued)

FOREIGN PATENT DOCUMENTS

GB 564126 * 9/1944

OTHER PUBLICATIONS

English Translation of JP2001-1396.*
(Continued)

*Primary Examiner* — Matthew J Daniels
*Assistant Examiner* — Hana C Page
(74) *Attorney, Agent, or Firm* — The Dobrusin Law Firm, P.C.

(57) ABSTRACT

A forming and trimming tool (100) operable to form and trim a composite material part. The tool includes a lower die (150), a core (115) mounted to the lower die, at least one lower pressure pad (120) mounted to the lower die, and a cutter (125) mounted to the lower die. Additionally, the tool includes an upper die (105), a cavity mounted to the upper die, and at least one upper pressure pad (110) mounted to the upper die.

17 Claims, 12 Drawing Sheets

(51) Int. Cl.
*B29C 51/32* (2006.01)
*B29C 51/00* (2006.01)
*B29K 105/06* (2006.01)

(52) U.S. Cl.
CPC .............. *B29C 70/46* (2013.01); *B29C 70/56* (2013.01); *B29C 51/002* (2013.01); *B29K 2105/06* (2013.01); *B29K 2905/12* (2013.01)

(58) Field of Classification Search
USPC ........................................................ 264/163
See application file for complete search history.

(56) References Cited

U.S. PATENT DOCUMENTS

| | | | | |
|---|---|---|---|---|
| 5,238,640 | A * | 8/1993 | Masui | B29C 43/184 |
| | | | | 264/266 |
| 6,041,639 | A * | 3/2000 | Pacher | B21D 25/02 |
| | | | | 72/294 |
| 7,997,894 | B2 * | 8/2011 | Schilles | B29C 43/203 |
| | | | | 425/235 |
| 8,261,591 | B2 * | 9/2012 | Hielscher | B21D 24/16 |
| | | | | 72/334 |
| 8,511,362 | B2 | 8/2013 | Walczyk | |
| 8,790,563 | B2 | 7/2014 | Takano et al. | |

OTHER PUBLICATIONS

"Simple Tool Steel: Properties of Tool Steel," Available on Aug. 25, 2010, Retrieved Nov. 25, 2017 <http://www.simplytoolsteel.com/properties-of-tool-steel.html>.*

* cited by examiner

FORMING TOOL WITH INTEGRAL CUTTING FOR COMPOSITE MATERIAL

FIELD OF INVENTION

Embodiments of the present invention relate to a forming tool with integral cutting for composite materials and methods of use.

BACKGROUND OF THE INVENTION

The demand for greater fuel efficiency in vehicles is driving a need for the use of lighter materials, including, for example, carbon fiber composite material. Present day carbon fiber composite materials represent a new class of materials that traditionally have not been used in high volume production. As a result, component design, engineering, materials and manufacturing process development for the economical, high volume production of composite material vehicle parts is not very well understood. Furthermore, the sustainability of carbon fiber composite materials has not been thoroughly considered as it pertains to mass commoditization in the automotive market.

Accordingly, there is a need in the art for improved methods and devices for forming composite materials in order to, for example, achieve the weight saving potential of carbon fiber composites.

SUMMARY OF EMBODIMENTS OF THE INVENTION

Embodiments of the present invention are directed to a fully-automated combined form-trim system and methods of use. In embodiments, the system has a short-cycle time (e.g., less than 3 minutes) with optimized processing steps for forming and trimming composite materials (prior to a curing process). By implementing embodiments of the present invention to produce the formed and trimmed composite materials, the weight-saving potential of carbon fiber composites can be more efficiently realized. The use of a forming and trimming tool can lead to lower waste while meeting the performance requirements of structural laminates.

An embodiment of the invention is directed to an integrated forming and trimming tool operable to form and trim a composite material part. The forming and trimming tool comprises a lower die, a core mounted to the lower die, at least one lower pressure pad mounted to the lower die, and a cutter mounted to the lower die. Additionally, the tool comprises an upper die, a cavity mounted to the upper die, and at least one upper pressure pad mounted to the upper die.

In further embodiments of the invention, the forming/trimming tool further comprises a plurality of upper stop blocks mounted to the upper die, and a plurality of lower stop blocks mounted to the lower die.

In additional embodiments of the invention, the forming/trimming tool further comprises a plurality of alignment pins mounted on the upper die, and a plurality of corresponding bushings mounted on the lower die. The plurality of corresponding bushings are structured and arranged to receive the plurality of alignment pins, respectively, to provide alignment of the core and the cavity.

In yet further embodiments of the invention, the core and the cavity comprise substantially reciprocal shapes corresponding to a desired shape of the composite material part.

In further embodiments of the invention, the at least one lower pressure pad comprises a plurality of lower pressure pads.

In additional embodiments of the invention, the forming/trimming tool further comprises at least one mount structured and arranged to support the at least one lower pressure pad.

In yet further embodiments of the invention, the forming/trimming tool further comprises a plurality of lower pressure pad springs structured and arranged to maintain the lower pressure pads in a loading position while in a preloaded state.

In further embodiments of the invention, the forming/trimming tool further comprises a plurality of upper pressure pad springs and a plurality of at least one of core springs and nitrogen cylinders.

In additional embodiments of the invention, the plurality of lower pressure pad springs, the plurality of upper pressure pad springs, and a plurality of core springs are structured and arranged such that upon a downward vertical movement of the upper die towards the lower die, and an resulting increase of applied pressure, the plurality of lower pressure pad springs begin to compress first, the plurality of upper pressure pad springs compress after the plurality of lower pressure pad springs finish compressing, and the plurality of core springs compress after the plurality of upper pressure pad springs finish compressing. This applied pressure could also be angled from the vertical direction for certain applications with hardware that allows for transferring vertical motions to angled motion.

In yet further embodiments of the invention, the upper die is structured and arranged for vertical movement relative to the lower die.

In further embodiments of the invention, upon a downward vertical movement of the upper die towards the lower die, the at least one upper pressure pad is moved towards the at least one lower pressure pad to provide a clamping force to a composite material blank.

In additional embodiments of the invention, wherein upon a further downward vertical movement of the upper die towards the lower die, the cavity is moved towards the core to shape the composite material part from the composite material blank.

In yet further embodiments of the invention, wherein upon a yet further downward vertical movement of the upper die towards the lower die, a shearing edge of the cavity is moved past a shearing edge of the cutter to trim the composite material blank. These shearing edges could also be angled from the vertical direction for certain applications with hardware that allows for transferring vertical motions to angled motion.

In further embodiments of the invention, the clamping force is configured to clamp a perimeter region of the composite material blank with a sufficient force during a forming operation and during a trimming operation.

In additional embodiments of the invention, the sufficient force is large enough to prevent wrinkling of the composite material blank, but small enough to prevent tearing of composite the material blank, while allowing for controlled sliding of the composite material blank.

In yet further embodiments of the invention, a force applied to the composite material blank dynamically increases with a downward vertical movement of the upper die towards the lower die. These forces could also be angled from the vertical direction for certain applications with hardware that allows for transferring vertical motions to angled motion.

In further embodiments of the invention, the forming/trimming tool further is in combination with a press structured and arranged to provide vertical movement of the upper die relative to the lower die.

In additional embodiments of the invention, a stroke of the press is continuous through a composite material holding and control stage, a composite material forming stage; and a composite material edge trimming stage.

In yet further embodiments of the invention, the at least one upper pressure pad and the at least one lower pressure pad comprise steel.

An embodiment of the invention is directed to a method of forming and trimming a composite material part. The method comprises loading a composite material blank in a forming/trimming tool arranged in a press, lowering the press to move the forming/trimming tool from loading position to an initial position, lowering the press to move the forming/trimming tool from the initial position to final forming position to form the composite material part from the composite material blank, lowering the press to move the forming/trimming tool from the final forming position to a final cutting position to trim the composite material blank, raising the press to move the forming/trimming tool from the final cutting position to the loading position; and removing the formed and trimmed composite part from the forming/trimming tool.

An embodiment of the invention is directed to a forming/trimming tool operable to form and trim a composite material part. The forming/trimming tool comprises a first die, at least one first pressure pad mounted to the first die, and a cutter mounted to the first die. The forming/trimming tool additionally comprises a second die, and at least one second pressure pad mounted to the second die. The forming/trimming tool further comprises a core mounted to one of the first die and the second die and a cavity mounted to the other of the first die and the second die.

BRIEF DESCRIPTION OF THE FIGURES

For a more complete understanding of the invention, as well as other objects and further features thereof, reference may be had to the following detailed description of the invention in conjunction with the following exemplary and non-limiting drawings wherein.

Figure 1:
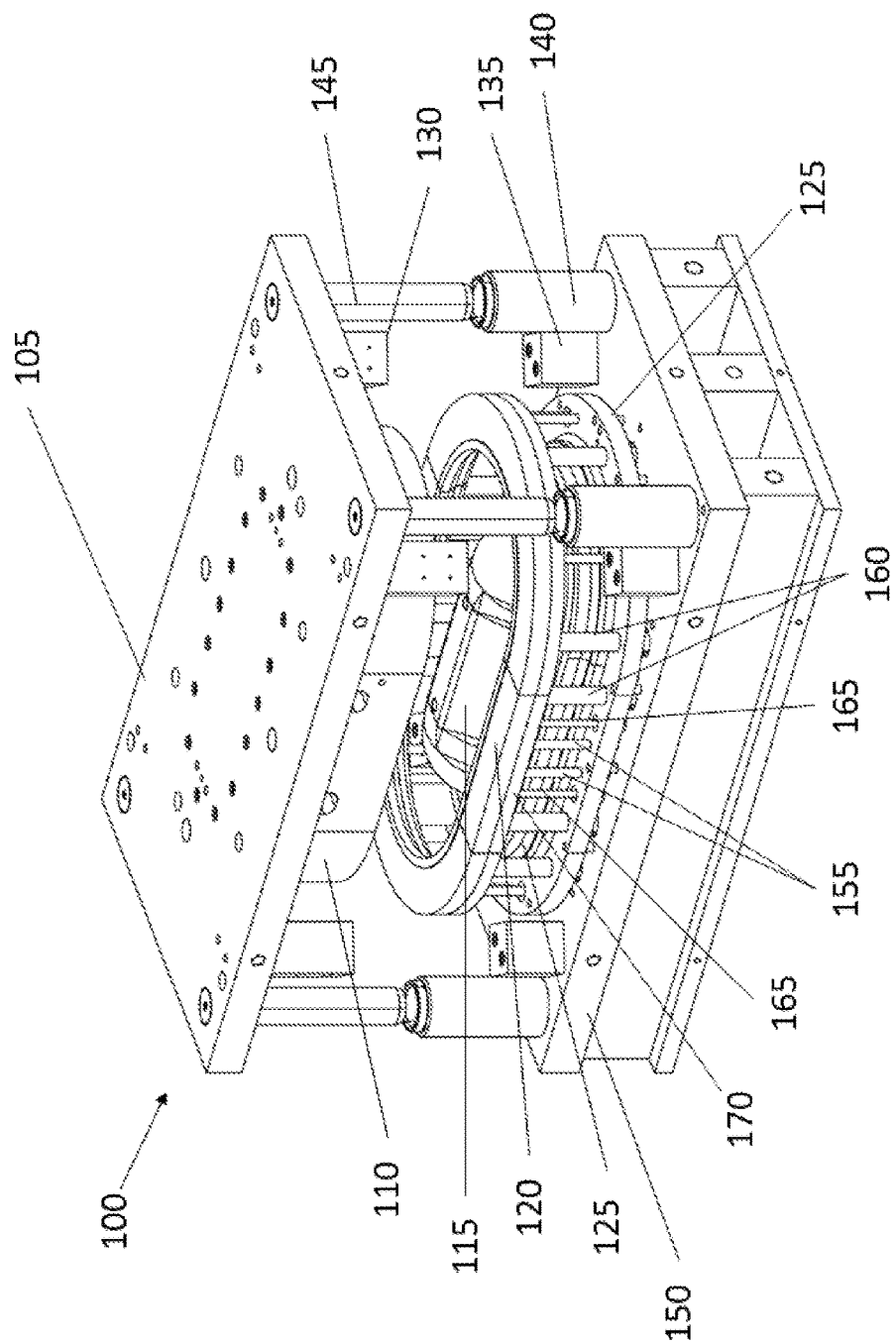
FIG. 1 illustrates a view of an exemplary and non-limiting embodiment of a forming/trimming apparatus (or tool) in an open (or loading) position, which is configured to form a three dimensional, partial twin hemispherical shaped composite part in accordance with embodiments of the invention.

Reference numbers refer to the same or equivalent parts of the present invention throughout the various figures of the drawings.

DETAILED DESCRIPTION OF EMBODIMENTS OF THE INVENTION

In the following description, the various embodiments of the present invention will be described with respect to the enclosed drawings.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

As used herein, the singular forms "a," "an," and "the" include the plural reference unless the context clearly dictates otherwise. Except where otherwise indicated, all numbers expressing quantities, e.g., spring forces, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

In addition, reference to vertical movements of the tool also include angled movements of the tool from the vertical. These angled movements could include the clamping, forming, and cutting for certain parts that have features requiring non-vertical actions.

The various embodiments disclosed herein can be used separately and in various combinations unless specifically stated to the contrary.

For comparison, with an exemplary "hand-processing" of composite laminates (or a hand lay-up approach), composite materials (e.g., prepreg plies) are cut, oriented, stacked, and stitched followed by heating in an infra-red (IR) oven prior to a hand-forming and trimming operation. The part, once formed and trimmed, is moved to the molding tool station for subsequent part curing and consolidation. With this exemplary "hand-processing" the entire cycle took approximately one-hour (1-hr) with the forming and trimming accounting for more than half of the process time.

In contrast to "hand-processing," with an automated processing of composite laminates including a combined forming-trimming operation in accordance with embodiments of the present invention, and additionally including one or more of, e.g., automated fabric handling/cutting and lamination/stitching, cycle times of less than three (3) minutes are achievable. That is, by utilizing embodiments of the present invention, the part cycle time is reduced by an order of magnitude (e.g., from an hour to a few minutes).

Embodiments of the present invention are directed to a combined forming/trimming system structured and arranged for forming and cutting of laminates, and methods of use. In embodiments, the system may be fully-automated. In embodiments, the system has a short-cycle time (e.g., less than 3 minutes) with optimized processing steps for forming and cutting of composite material laminates. By implementing embodiments of the present invention to produce the formed and trimmed composite materials, the weight-saving potential of carbon fiber composite materials, for example, can be more efficiently realized. In embodiments, the composite materials may include CF-thermoset matrix based prepregs (e.g., continuous and/or random-chopped), dispersion prepreg materials and hot melt prepreg materials. With an exemplary and non-limiting embodiment, a thermosetting temperature of the composite materials is approximately 60° C. to 80° C.

By utilizing a combined forming and trimming in a single tool in accordance with embodiments of the present invention, the overall processing cost is reduced by eliminating a second set of tools to trim the composite material after forming. Moreover, the combined processing reduces the overall manufacturing time by performing these two steps in a single tool. With the combined processing, precise alignment of the formed part and the cutting (or trimming) edge is achieved, resulting in a higher quality compression molded part. Furthermore, the tool is operable to shape the formed part in a final shape, or approximately a final shape. Accordingly, little or no additional shaping of the formed part is required downstream of the forming/trimming process (e.g., during a curing process), resulting in a more efficient process.

Additionally, in accordance with further aspects of the invention, by preforming and trimming the part before compression molding (e.g., curing), the compression molding tool can be simplified. Because the part is already formed (or mostly formed), wrinkling or other forming issues are not as likely during compression molding. Therefore, when used in combination with embodiments of the present invention, a compression molding tool may require fewer features to control and/or prevent wrinkling.

Embodiments of the present invention utilize composites in high volume manufacturing processes for forming prepreg composites to shape and trimming (or cutting) the prepreg composites using fast cycle times. In embodiments, each of these process steps may utilize robotic automation. In accordance with embodiments of the invention, by forming and trimming the composite materials (e.g., prepreg plies) prior to compression molding (e.g., curing), embodiments of the present invention enable complex geometries to be created and greatly simplify the subsequent compression molding process.

In accordance with embodiments of the invention, in a pre-forming step (i.e., prior to the forming and trimming), the composite material blank may be heated to soften (but not cure) the composite material blank. Additionally the heating may be controlled (e.g., raised or lowered) to adjust (e.g., increase or decrease) the tackiness of one or more layers of the composite material. In accordance with embodiments of the invention, increased tackiness may be desired to, for example, improve adhesion between the plies of the composite material. In embodiments with robotic-handling of the composite material, the tackiness of the composite material may be lowered to improve handling by the robot (e.g., handling accuracy and/or placement accuracy).

FIG. 1 illustrates a view of an exemplary and non-limiting embodiment forming/trimming apparatus (or tool) 100 in an open (or loading) position. With the exemplary embodiment of FIG. 1, the tool is configured to form three dimensional shaped composite parts. The tool 100 is operable to (1) form the prepreg into the desired shape; and (2) cut (or trim) the outer perimeter to size. In accordance with aspects of the present invention, the two steps are performed prior to the compression molding (e.g., curing) process.

As shown in FIG. 1, the tool 100 includes an upper die 105 and a lower die 150 (e.g., a Danly Die Set). A core 115 mounted on the lower die 150 together with a cavity (not shown in FIG. 1, but see FIG. 5) mounted on the upper die 105 are configured to form the shaped composite part. With the exemplary embodiment of FIG. 1, the core 115 and the cavity (not shown) are configured to form a double dome shaped composite part. The tool 100 additionally includes one or more upper pressure pads 110 mounted to the upper die 105 and one or more lower pressure pads 120 mounted to the lower die 150 via one or more corresponding mounts 170. In embodiments, the pressure pads 110, 120 may comprise steel, or other suitable material. In further embodiments, the pressure pads 110, 120 may also comprise nylon shoes. In accordance with aspects of embodiments of the invention, the material properties (e.g., material type, surface smoothness, etc.) of the upper pressure pad(s) 110 and/or lower pressure pad(s) 120 may be selected and/or configured to alter a friction of the upper pressure pad(s) 110 and/or the lower pressure pad(s) 120. While references are made to the tool features as "upper" and "lower," it should be understood that this is an exemplary and non-limiting embodiment, and the tool 100 could be mounted in reverse and still operate in the same manner.

As shown in FIG. 1, the tool 100 includes a cutter 125 that is mounted to the lower die 150. In embodiments, the cutter 125 may be a single unitary structure, or may include discrete elements (e.g., four discrete portions). The tool 100 further includes a plurality of upper stop blocks 130 mounted to the upper die 105 and a plurality of lower stop blocks 135 mounted to the lower die 150. The upper stop blocks 130 and the lower stop blocks 135 are structured and arranged to stop relative movement of the core 115 and the cavity at a configurable threshold (e.g., a minimum distance) to prevent over travel of the shearing edges that perform the trimming operation. With an exemplary and non-limiting embodiment, the upper and lower stop blocks are sized to allow for a 3 mm by-pass of the shearing edge of the cavity with the shearing edge of the cutter 125. In embodiments, the upper stop blocks 130 and/or the lower stop blocks 135 may be interchanged with differently sized stop blocks to adjust the configurable threshold.

The tool 100 additionally includes a plurality of alignment pins 145 mounted on the upper die 105 and a plurality of corresponding bushings 140 mounted on the lower die 150. In embodiments, the alignment pins 145 (e.g., large diameter pins) may include bushing ball bearings to provide a more precise alignment of the upper die 105 and lower die 150 (and thus, the alignment of the shearing edges), and prevent lockups.

In embodiments, the tool 100 is structured and arranged to hold one or more layers of composite material (e.g., carbon fiber pre-impregnated woven fabric (or prepreg) material (not shown)) between the upper pressure pad(s) 110 and the lower pressure pads 120, shape the one or more layers of the composite material into a 3D form between the cavity (not shown) and the core 115, join the layers of composite material together with pressure, and cut the one or more layers of composite material with a shearing edge of the cavity and a shearing edge of the cutter 125. In accordance with aspects of embodiments of the invention, all of these processes are performed by a single self-contained tool (e.g., the exemplary tool 100) using a "continuous" press operation. With an exemplary embodiment, the forming tool 100 is installed in a press (not shown, see FIG. 11) structured and arranged to actuate the upper die 105 relative to the lower die 150.

In accordance with aspects of embodiments of the present invention, the tool 100 is operable to hold the one or more carbon fiber layers with an appropriate (or optimum) amount of pressure between the upper pressure pads 110 and lower pressure pads 120 while being formed. The optimum pressure allows the composite material (or fabric) to slide appropriately so as to conform to shape being formed within tool 100, while also preventing wrinkling, tearing, or fabric damage. In embodiments, the tool 100 includes a clamping mechanism (e.g., including the upper pressure pads 110 and lower pressure pads 120, the plurality of mounts 170, a plurality of stop pins 155, and a plurality of pad alignment pins 160 amongst other components) structured and arranged to apply a configurable amount of force to allow the composite material to be held while also allowing a sliding movement of the composite material through the holder with a predetermined and adjustable force. In embodiments, the clamping mechanism utilizes a plurality of lower pressure pad springs 165, and a plurality of upper pressure pad springs (not shown).

As shown in FIG. 1, an exemplary and non-limiting embodiment of the present invention, the plurality of lower pressure pads 120 may include four lower pressure pads, with each respective pressure pad mounted on a corresponding mount 170 having associated lower pressure pad springs 165. The plurality of stop pins 155 are structured and arranged to prevent the lower pressure pads 120 from rising too far. The plurality of pad alignment pins 160 are structured and arranged to precisely align the lower pressure pads 120 and the mounts 170 with the lower die 150. While the exemplary tool 100 includes four lower pressure pads 120 and corresponding mounts 170, embodiments of the present invention contemplate a lower number or greater number of lower pressure pads 120 and corresponding mounts 170 (e.g., one pressure pad, six pressure pads, eight pressure pads, sixteen pressure pads, etc.)

While the composite material (or fabric) is held, a forming motion of the tool 100 includes the travel of the cavity (not shown) during the closing of the tool to create the formed shape in the composite material through interfacing with the core 115. Through the pressure of the closed tool, the layers of composite material become bonded together due to a combination of the prepreg's tacky surface and the applied tool pressure.

In accordance with additional aspects of embodiments of the invention, once the forming motion of the tool 100 is complete, the cutting movement (or action) of the tool 100 begins. Further downward movement of the cavity, causes a shear edge (not shown) on a perimeter of the cavity (not shown) to by-pass a shearing edge of the cutter 125 resulting in the cutting (or trimming) of the composite material.

Figure 2:
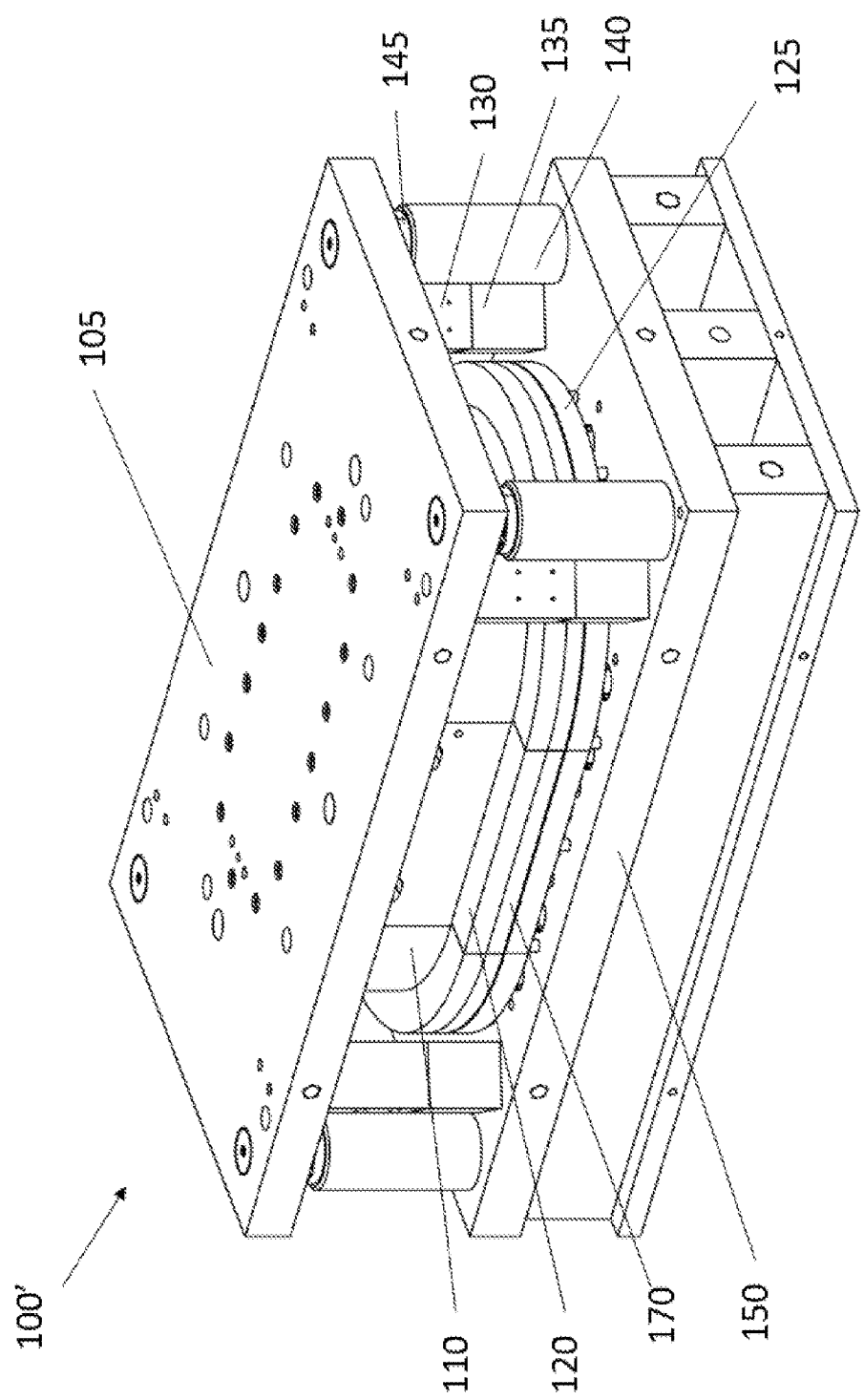
FIG. 2 illustrates a view of the exemplary tool in a closed (or final trimming) position in accordance with embodiments of the invention.

FIG. 2 illustrates a view of the exemplary tool 100 in a closed (or final trimming) position. In the closed position, the upper die 105 and the lower die 150 have been moved towards each other, relatively, such that the core 115 and the cavity (not shown) form the shaped composite part. In the closed position, the one or more upper pressure pads 110 and the one or more lower pressure pads 120 clamp the one or more layers of composite material (e.g., carbon fiber pre-impregnated woven fabric (or prepreg) material) (not shown). As additionally shown in FIG. 2, in the closed position, the plurality of upper stop blocks 130 are in contact with the plurality of lower stop blocks 135, and the plurality of alignment pins 145 are received within the a plurality of corresponding bushings 140.

In embodiments of the invention, the process involves heating the composite material sheets (or blanks) up to a softening temperature (for example, 50° C.-70° C., e.g., below a curing temperature) prior to insertion into the tool 100. The tool 100 is then closed wherein the forming, joining, and cutting occurs. In embodiments, the tool 100 may be maintained at room temperature or cold temperature to draw the heat out from the pre-heated composite material. This heating and cooling process aids the shape retention of the formed part once removed from the tool 100.

Figure 3:
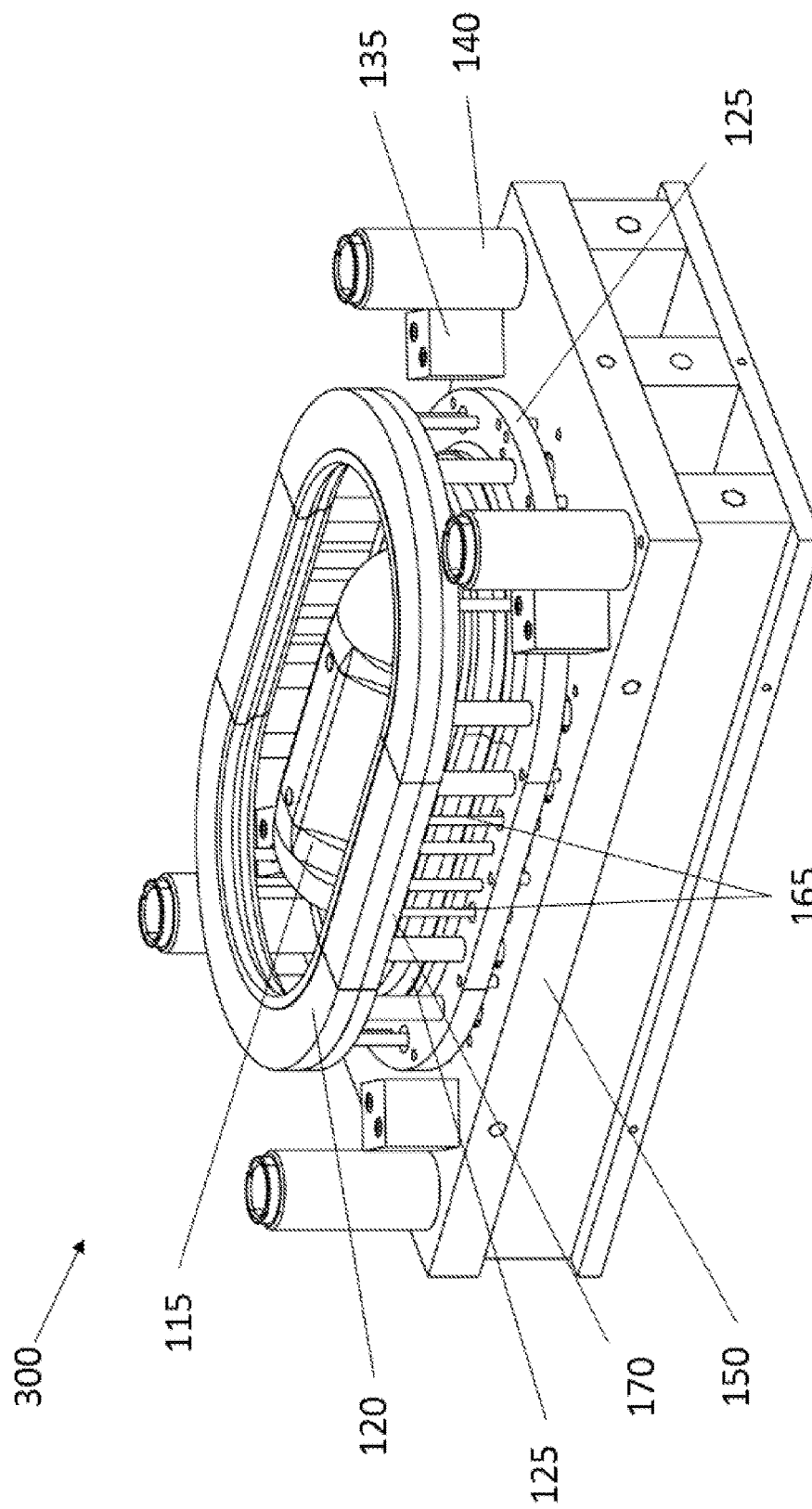
FIG. 3 illustrates a view of the lower portion of the tool in an initial position in accordance with embodiments of the invention.

FIG. 3 illustrates a view of the lower portion 300 (e.g., the lower die 150 and the components attached thereto) of the exemplary tool 100 in an initial position. As shown in FIG. 3, the lower portion 300 includes the core 115, the one or more lower pressure pads 120 and corresponding mounts 170, the plurality of lower stop blocks 135, the plurality of corresponding bushings 140, and the cutter 125. In this initial position, the lower pressure pads 120 and corresponding mounts 170 are at a distance from the cutter 125, and the plurality of springs 165 are in a relatively uncompressed state.

Figure 4:
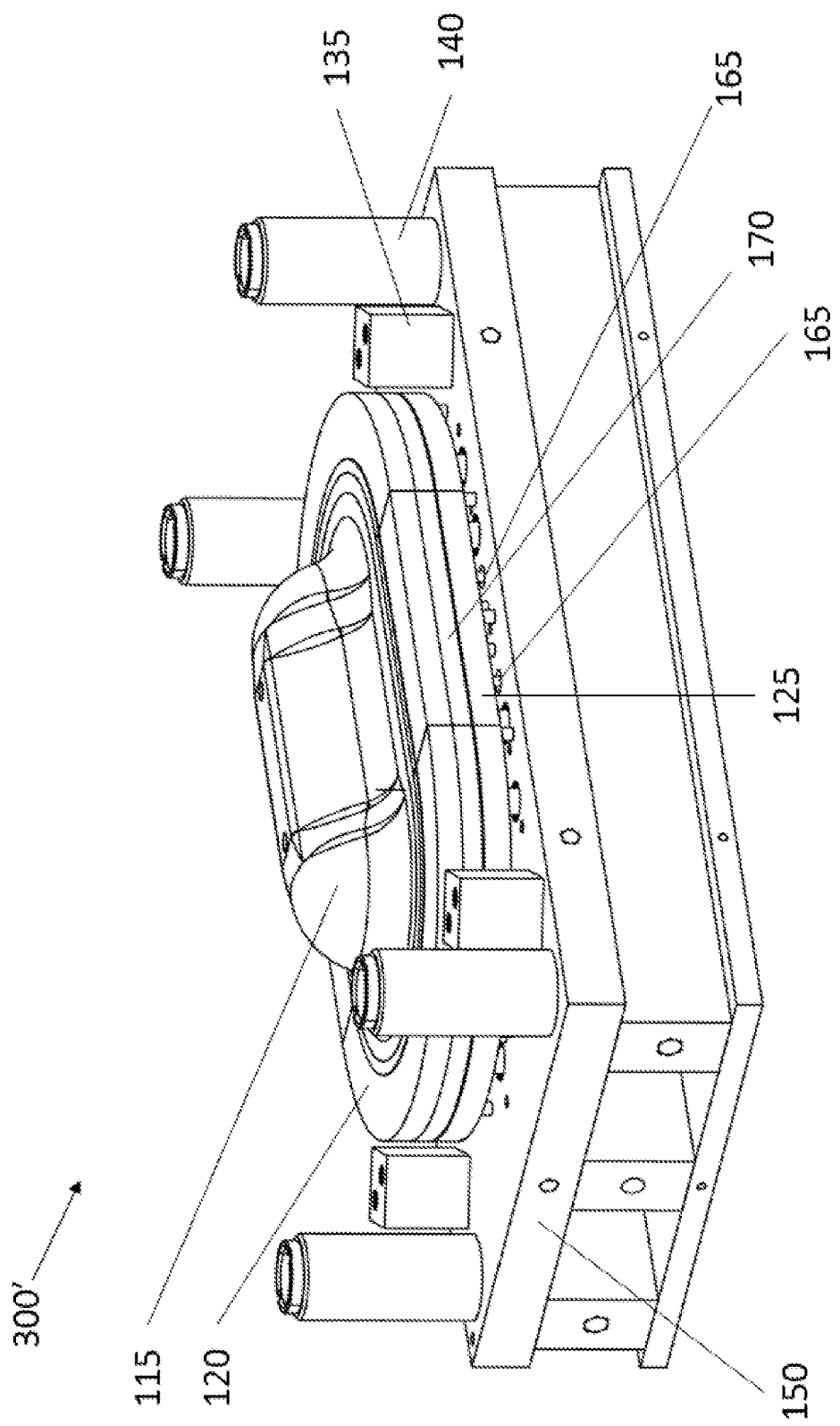
FIG. 4 illustrates a view of the lower portion of the tool in a compressed final trimming position in accordance with embodiments of the invention.

FIG. 4 illustrates a view of the lower portion 300' (e.g., the lower die 150 and the components attached thereto) of the exemplary tool 100 in a compressed final trimming (or closed) position. In the compressed final trimming (or closed) position shown in FIG. 4 (which is shown without the upper portion of the tool 100 to more clearly illustrate aspects of embodiments of the present invention), the plurality of mounts 170 (having the lower pressure pads 120 mounted thereon) are in contact the cutter 125. In the compressed (or closed) position, the lower pressure pad springs 165 are in a relatively compressed state.

Figure 5:
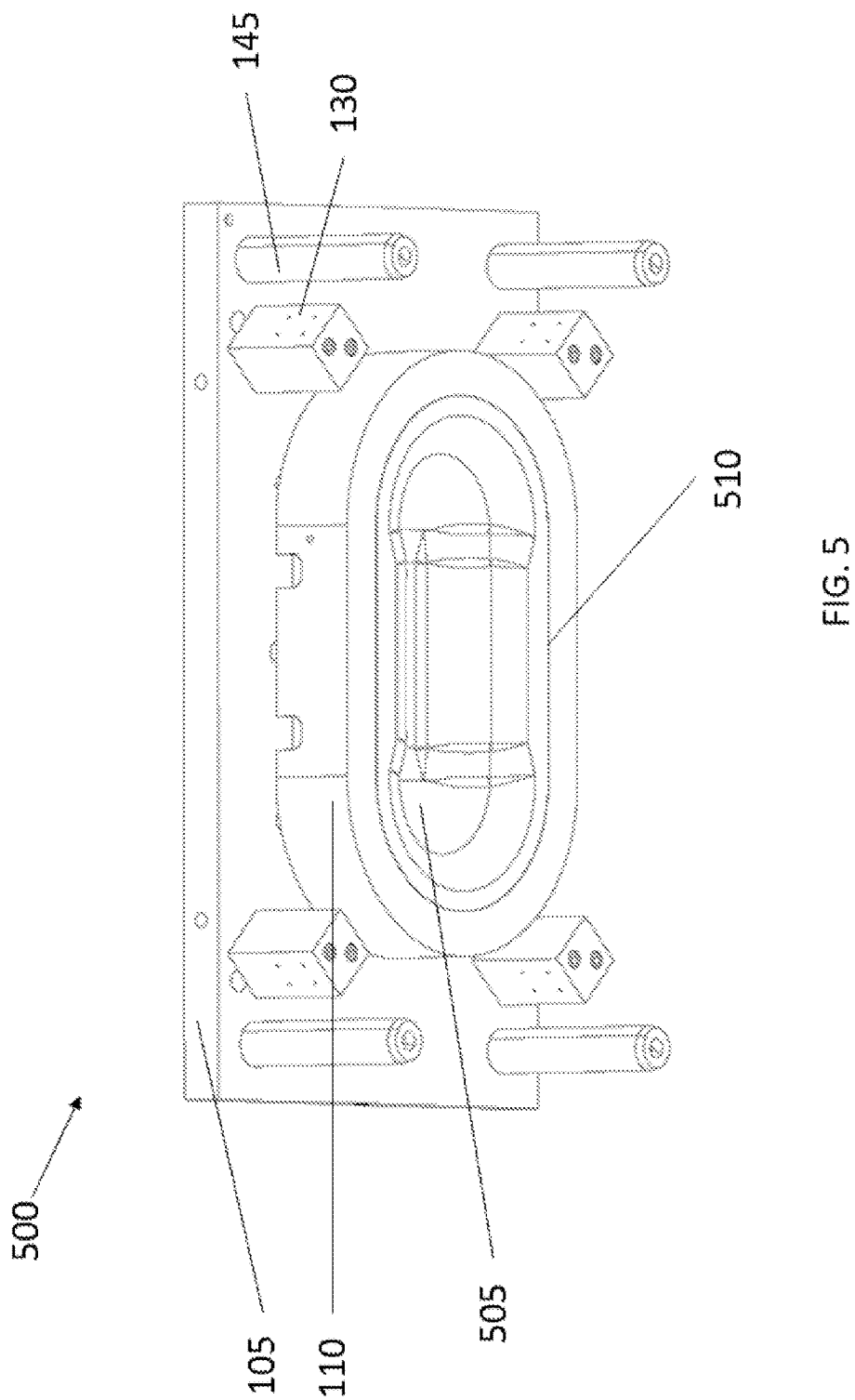
FIG. 5 illustrates a view of an upper portion of the exemplary tool in accordance with embodiments of the invention.
Figure 6:
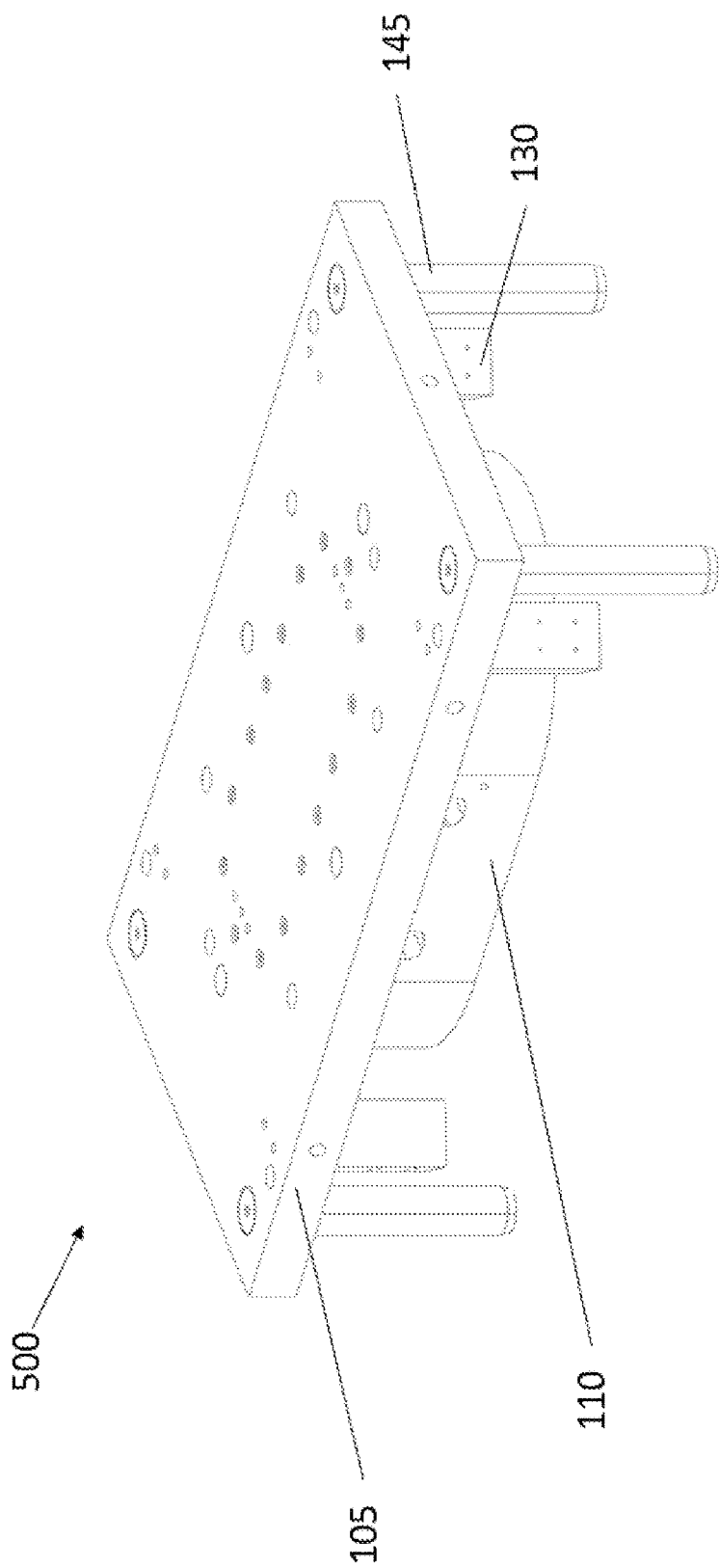
FIG. 6 illustrates an alternative view of the upper portion of the exemplary tool in accordance with embodiments of the invention.

FIG. 5 illustrates a view of the upper portion 500 (e.g., the upper die 105 and the components attached thereto) of the exemplary tool 100. As shown in FIG. 5, the upper portion 500 includes the upper die 105, the cavity 505 having a shearing edge 510, the one or more upper pressure pads 110, the plurality of upper stop blocks 130, and the plurality of alignment pins 145. FIG. 6 illustrates an alternative view of the upper portion 500 of the exemplary tool 100 showing the upper die 105, the upper pressure pad(s) 110, the plurality of upper stop blocks 130, and the plurality of alignment pins 145.

During a closure stroke (e.g., travel from a loading position, through an initial position to a final-trimming position), the tool 100 is operable to: (1) hold the composite material; (2) form the composite material into the desired shape; and (3) cut (or trim) the outer perimeter of the composite material to size. As the press is lowered in the closure stroke, initially, no force is applied to the material, then increased force is applied as the upper pressure pad 110 and lower pressure pad 120 contact the material, and finally, a peak force is applied during the cutting (or trimming) of the composite material. In accordance with aspects of embodiments of the invention, the tool 100 is operable to hold, form, and cut the composite material in that order. It is important that each step is completed before proceeding to the next step. For example, if the cutting occurs before the forming is complete, the cutting process will interrupt the forming process. In embodiments of the invention, the rate of the closure stroke may be adjustable to decrease or increase the draw speed of the tool 100.

Figure 7:
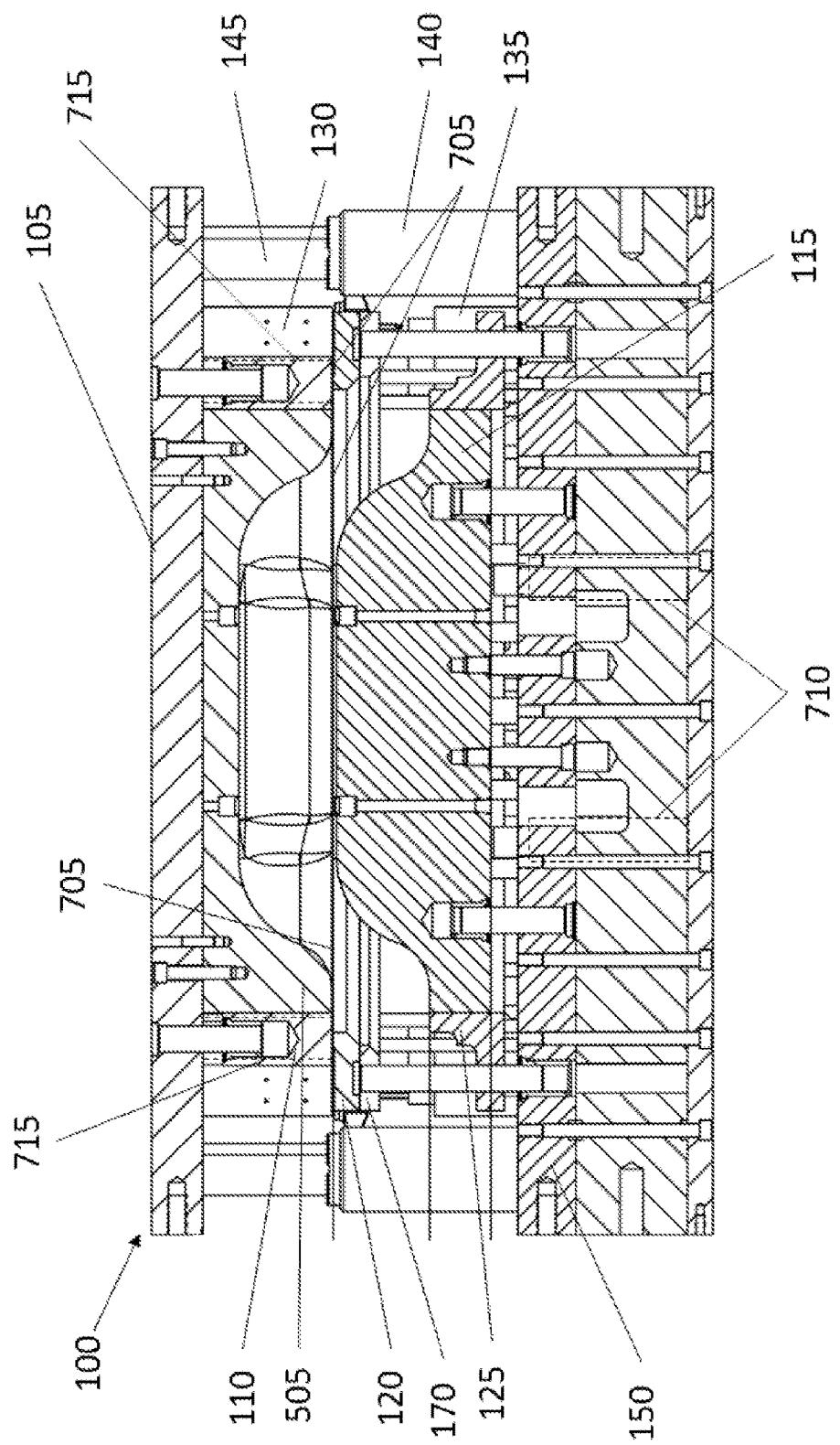
FIG. 7 illustrates a sectional view of the exemplary tool in an initial position in accordance with embodiments of the invention.

FIG. 7 illustrates a sectional view of the exemplary tool 100 in the initial position. As shown in FIG. 7, with the tool 100 in the initial position, one or more layers of composite material (e.g., carbon fiber pre-impregnated woven fabric (or prepreg) material) 705 are arranged above the plurality of lower pressure pads 120 arranged on the corresponding mounts 170. The upper surfaces of the plurality of lower pressure pads 120 are substantially aligned with a center of the core 115, so that, preferably, no premature deflection of the composite material 705 over the core occurs. The upper pressure pad 110 and a perimeter portion of the cavity 505 are in contact with the upper surface of the composite material 705. The upper surface of the cutter 125 is aligned with a perimeter edge of the core 115. As further shown in FIG. 7, in the initial position, the upper stop blocks 130 and corresponding lower stop blocks 135 are separated from one another and the alignment pins 145 are partially received within the corresponding bushings 140. As additionally shown in FIG. 7, the exemplary tool 100 includes core springs 710 (shown in dashed lines) and upper pressure pad springs 715 (shown in dashed lines).

While not shown in FIG. 7, a loading position of the tool is utilized prior to moving the tool 100 into the initial position. In the loading position, the plurality of lower pressure pads 120 arranged on the corresponding mounts 170 and the core 115 are vertically spaced from the upper pressure pad 110 and the cavity 505 (e.g., by raising the upper die 105) to allow access for placement of the composite material 705 in the tool 100. The upper surfaces of the plurality of lower pressure pads 120 are substantially aligned with the center of the core 115, and together the lower pressure pads 120 and the center of the core 115 support the composite material (or fabric) 705. The composite material blank 705 is initially level with the center portion of the core 115 resting on the top of three dimensional core. At this height, the core 115 provides additional support of the planar composite material (or blank) 705 until clamping between the upper pressure pad(s) 110 and the lower pressure pads 120. In accordance with aspects of embodiments of the invention, utilizing the center portion of the core 115 to support positioning the composite material blank 705 promotes proper forming of the composite material 705. Upon loading of the composite material 705, the upper pressure pad 110 and the cavity 505 are vertically spaced from the upper surface of the composite material 705.

Figure 8:
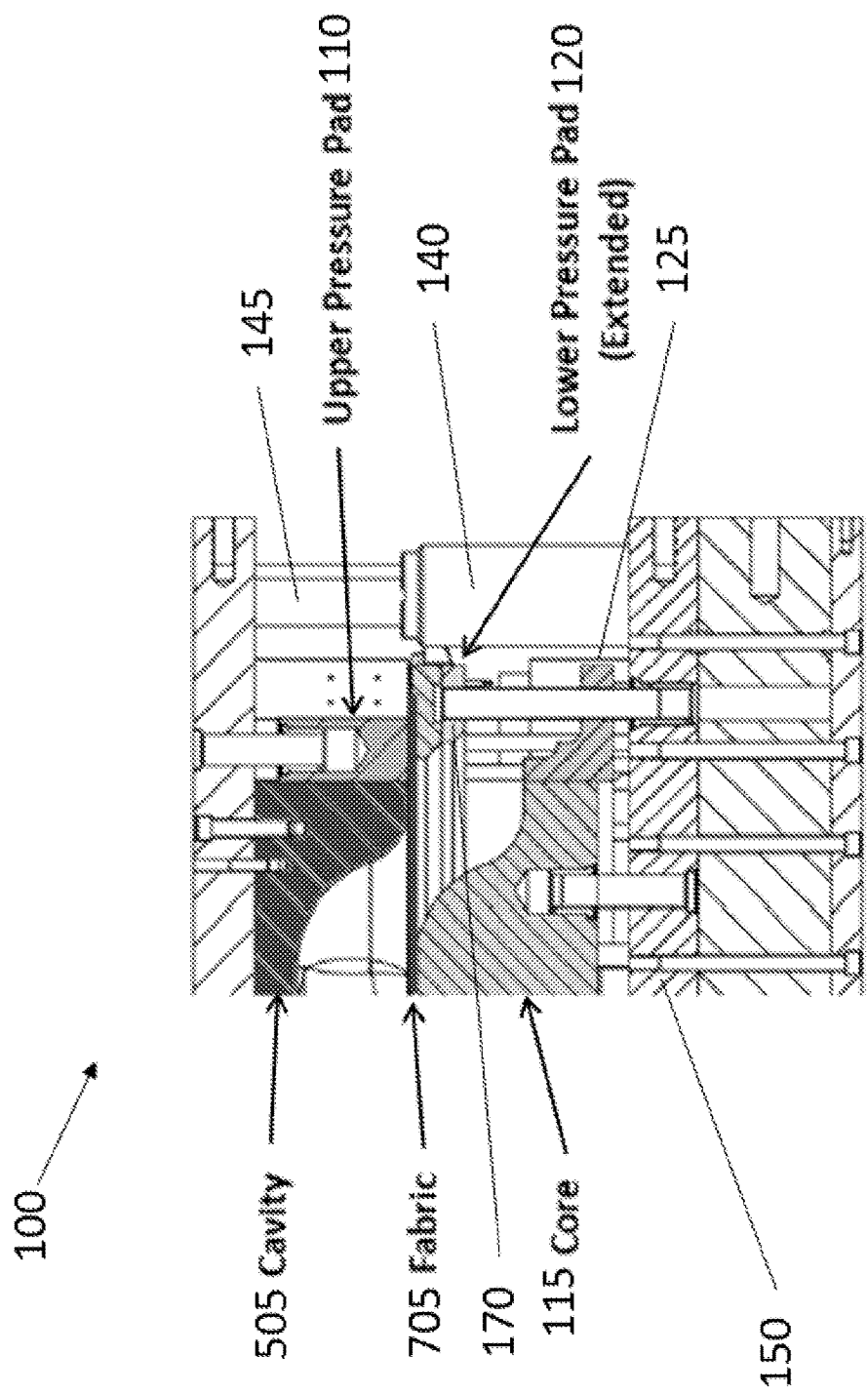
FIG. 8 illustrates an exemplary sectional view of the tool demonstrating a blank holder operation at the beginning of the forming step (e.g., in the initial position) in accordance with embodiments of the invention.

FIG. 8 illustrates an exemplary sectional view of the tool 100 demonstrating a composite material blank holder operation at the beginning of the forming step (e.g., in the initial position). As shown in FIG. 8, the composite material blank holder surfaces (e.g., the upper pressure pad(s) 110 and lower pressure pads 120) apply pressure on the composite material (or fabric) 705 before the forming process begins.

As the tool 100 closes to the initial position, as shown in FIG. 8, the planar composite material 705 is clamped between the upper pressure pads 110 and the lower pressure pads 120. That is, a blank holder pressure is applied at the very beginning of the forming process, while the composite material blank 705 is still planar. The perimeter of the cavity 505 is in contact with the upper surface of the prepreg material 705. As the tool 100 closes further, from the initial position, thereby beginning the forming process, the lower pressure pad springs (not shown in FIG. 8) are compressed into the core side of the tool 100. With an exemplary embodiment, the upper and lower pressure pads 110, 120 utilize springs to apply the pressure on the perimeter of the tool 100 and maintain (or increase) the pressure until the forming and cutting is complete.

Figure 9:
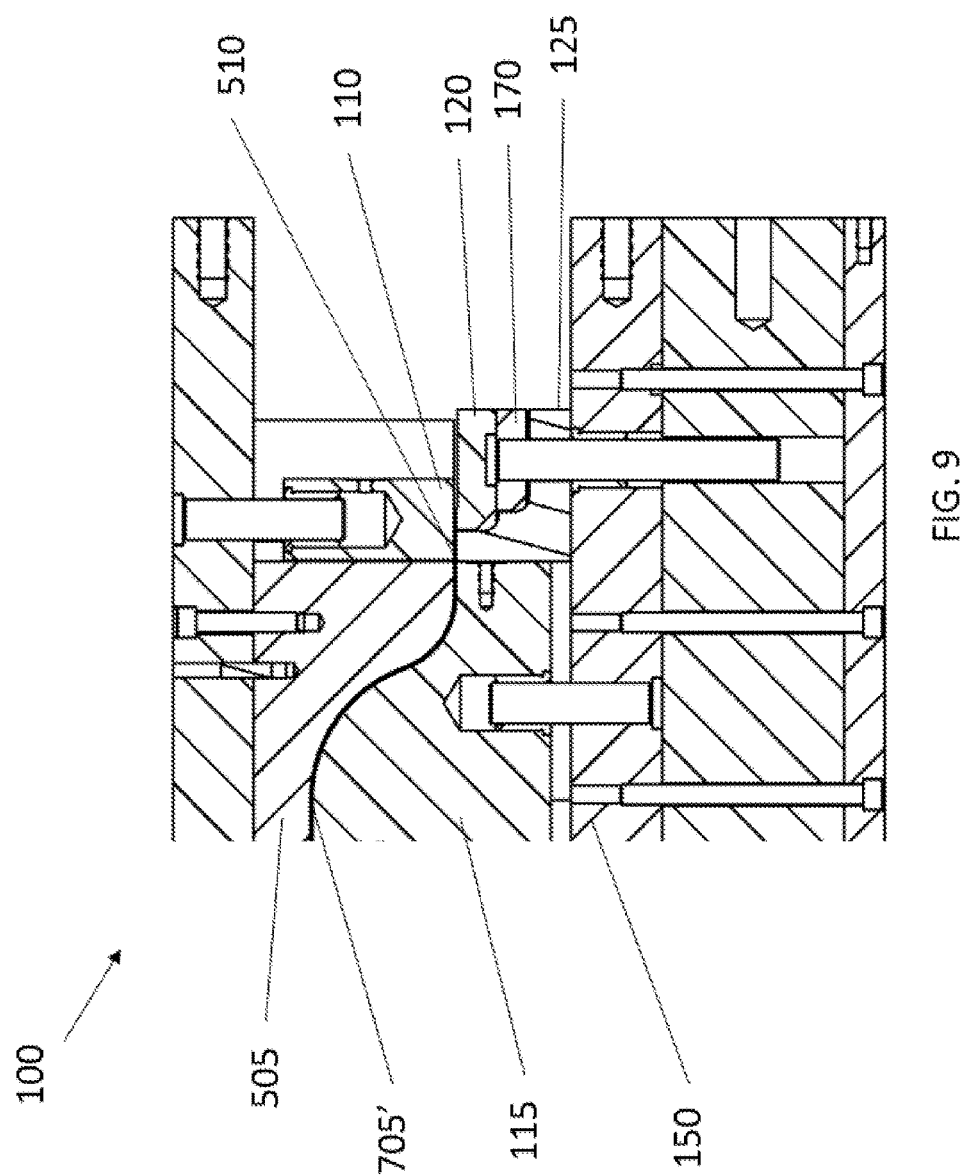
FIG. 9 illustrates an exemplary sectional view of the tool demonstrating a blank holder operation at the ending of the forming step (or the beginning of the trimming step) in accordance with embodiments of the invention.

FIG. 9 illustrates an exemplary sectional view of the tool 100 demonstrating a composite material blank holder operation at the end of the forming step (and therefore, at a beginning of the trimming step). As shown in FIG. 9, the upper die 105 and cavity 505 have been lowered and the formed composite material 705' is shaped between the cavity 505 and the core 115. At the end of the forming step, a perimeter portion of the formed composite material 705' remains between the upper pressure pads 110 and lower pressure pads 120. In the position shown in FIG. 9, the lower pressure pad springs (not shown, see FIG. 1) are fully compressed and the core 115 and the cavity 505 are at a predetermined and configurable offset (e.g., 2.20 mm). It should be noted that, in this position (final forming position), the core 115 is spaced from the lower die 150 (which allows for further downward movement of the core 115 together with the cavity 505 during the trimming stage). The upper pressure pad springs (not shown, see FIG. 7) are sized to produce a stiffer spring force, so as not to compress from the lower pressure pad forces. The core springs (not shown, see FIG. 7) are sized and configured to provide sufficient pressure to form the part before the cutting (or trimming) process begins. In an exemplary and non-limiting embodiment, the core springs comprise nitrogen springs (cylinders), which are operable to provide high forces in compact areas. In an exemplary and non-limiting embodiment, the forming forces between the core 115 and the cavity 505 are 76,500 N from the spring preloads, which is equivalent to 490 kPa over the part area.

Figure 10:
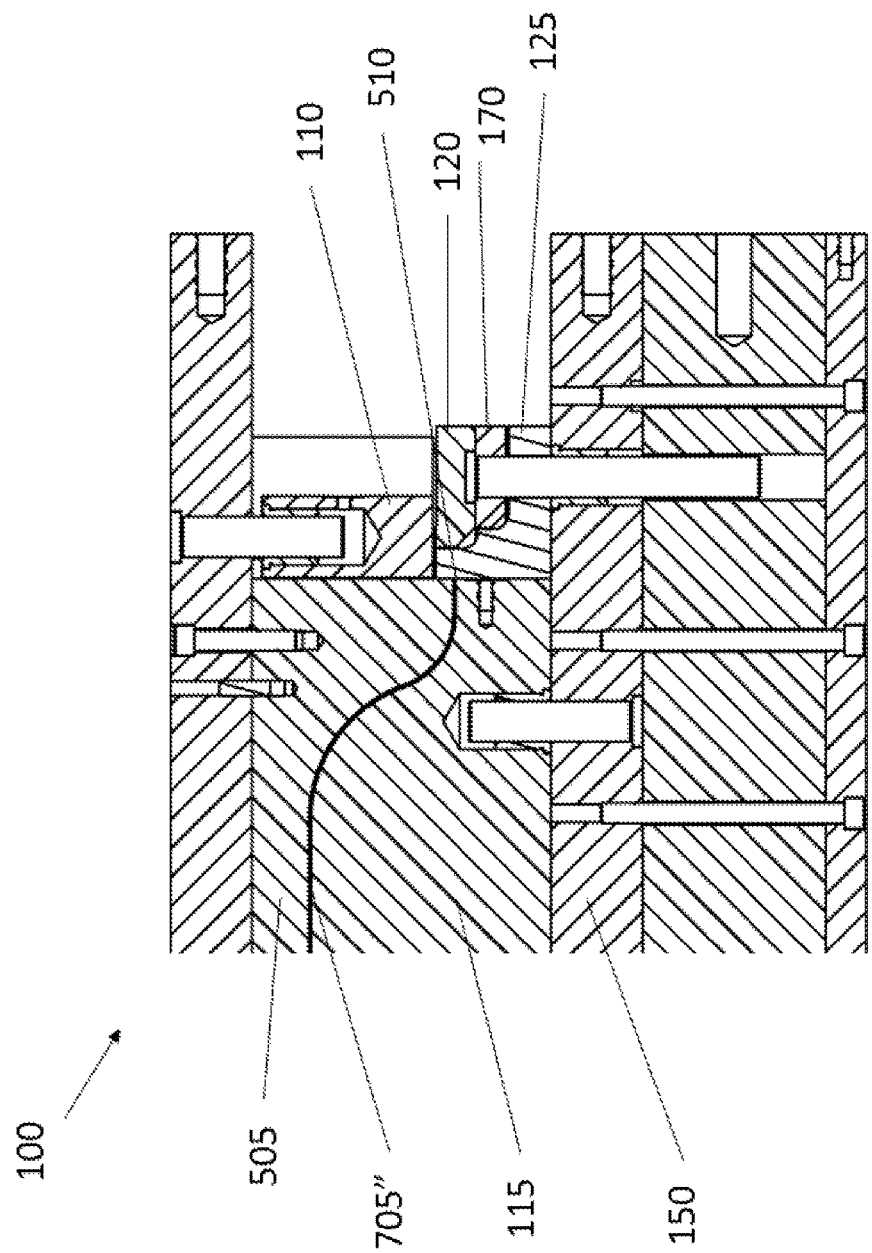
FIG. 10 illustrates an exemplary sectional view of the tool demonstrating a blank holder operation at the ending of the trimming step in accordance with embodiments of the invention.

FIG. 10 illustrates an exemplary sectional view of the tool 100 demonstrating a blank holder operation at the ending of the trimming step. As shown in FIG. 10, the trimming step is accomplished using the shear edge 510 of the cavity 505 and the shear edge of the cutter 125. As the tool 100 continues to close past the final forming position, the cavity 505 presses the core 115 to compress the core springs (not shown). It should be noted that in the final trimming position, the core 115 is in contact with the lower die 150. Through this motion, the shearing edge 510 of the cavity 505 by-passes the shearing edge of the cutter 125 resulting in the cutting the perimeter of the part. For example, as shown in FIG. 10, the formed and trimmed prepreg material 705" is cut (or trimmed) by the passing of the shear edges through further relative movement of the upper die 105 towards the lower die 150. During the trimming operation, the composite material (or fabric) 705" remains clamped by the upper and lower pressure pads 110, 120 to aid in producing a clean cut of the composite material.

Also, in accordance with aspects of embodiments of the invention, the shearing edge of the cutter 125 is located very close to the formed part geometry, and the composite material blank holder is arranged in close proximity to the cutting edge to reduce any unnecessary waste material (or scrap material) and improve the cut (e.g., quality and/or precision). In embodiments, the dimensional tolerance between the two shearing edges is small (gap+/−0.038 mm) in order to be effective at cutting. If the gap size is too large then the cut material (or fabric) will not be clean (e.g., the cutting will leave strands of uncut fabric). If the gap is too small, there may be interference with the two edges as they by-pass one another, and damage may result. With an exemplary and non-limiting embodiment, a small clearance of 0.038 mm per side may be used to eliminate tolerance stack-up and to cut the composite material 705 cleanly.

With an exemplary and non-limiting embodiment, the tool 100 utilizes the by-pass shear edge to cut the composite material (e.g., carbon fiber prepreg material) while maintaining a proper holding force. In embodiments, the peak proper holding force may increase with the number of plies of composite material being cut. The shear edges produce a clean cut around the perimeter of the cavity 505, which cannot be achieved with a blade cutting tool. That is, in contrast to the shearing edges, a sharp blade edge does not produce a clean cut, resulting in, e.g., fibers pulled out of the fabric. Moreover, as compared to a blade edge, the durability by-pass shear edge of the above embodiments is also much greater, and re-sharpening, design issues, and manufacturing tolerances are less critical with the shear by-pass design.

A clamping mechanism (or composite material blank holder) of the described embodiments comprises the pressure pad system operable to clamp and control the tension and slippage of the composite material (or fabric) during the forming. The clamping mechanism clamps the fabric around the full perimeter of the to-be-formed part. The clamping mechanism holds the one or more carbon fiber layers (or prepreg material or fabric) 705 with an appropriate (or optimum) amount of pressure between the upper pressure pads 110 and lower pressure pads 120 while being formed. The optimum pressure allows the composite material to slide appropriately so as to conform to the shape being formed within tool, while also preventing wrinkling, tearing, or damage to the composite material. For example, wrinkling and/or tearing of the carbon fiber prepreg can be an issue during forming if the pressure applied is not sufficient or too great. Thus, by using the clamping mechanism (or blank holder), wrinkling and tearing of the composite material 705 at an appropriate or optimal pressure by holding the composite material appropriately. For example, if wrinkles occur, the applied pressure is too low or friction is too low, and the spring pressure of the clamping mechanism may be increased. If tears occur during the forming process, the applied pressure is too high or friction is too high, and the spring pressure of the clamping mechanism may be decreased.

Different parts (e.g., different formed articles, different materials, different material thickness) may have a different optimum blank holder pressure (e.g., sufficient pressure to prevent wrinkling, but not so excessive as to promote a tearing of the fabric). Thus, in accordance with embodiments of the present invention, the blank holder pressure is adjustable on the tool (e.g., to reduce or eliminate inadvertent wrinkling or tearing). With an exemplary embodiment, the force may be adjusted in each zone by changing the spring type (e.g., size, materials, etc.). In certain embodiments, the spring pressure may be adjusted by manually changing one or more springs and/or a total number of springs (e.g., individually and/or in a modular manner). While the exemplary embodiment of FIG. 1 includes ten springs, additional or fewer springs may be utilized, for example to increase or decrease the granularity of the applied pressure. In embodiments, the tool may include one or more screw-driven springs to enable configuration for various amounts of pressure. In further embodiments, the spring pressure may be adjusted automatically, e.g., through computer control adjusting the spring pressures of one or more springs (or groups of springs). With a computer control of the spring pressures, a feedback between the press (e.g., detected spring force) and a spring pressure control may be used to optimize the applied spring pressure.

In embodiments, the blank holder is also divided into zones so that the clamping pressure is adjustable in different regions of the part. In an exemplary and non-limiting embodiment, the pressure pad system is divided into four independent zones. In embodiments, the force per unit length applied to the fabric may be approximately the same in each of the independent zones. In further embodiments, the force per unit length applied to the fabric may be different in some or all of the independent zones.

In embodiments, the tool 100 includes a clamping mechanism having three different spring loaded systems (e.g., lower pressure pad springs 165, upper pressure pad springs (not shown), and the core springs (not shown)) that function together at principal deflections during the closure stroke. The various sets of springs are used to allow for pressure to be generated and for movement of different components to occur in the tool 100. The springs are designed so as to generate the appropriate amount of force to clamp the fabric (in the blank holder), while allowing for controlled fabric sliding. In addition, the appropriate springs were used to allow for each process step to occur in sequence (as the both the deflection and the force increase). In embodiments of the invention, the tool utilizes the press surfaces and motion; wherein no external hydraulics are necessary to complete all of the steps. The stroke is continuous through all of the functions. The three functions of the spring loaded systems include: (1) fabric holding and control; (2) fabric forming; and (3) fabric edge trimming.

With an exemplary and non-limiting embodiment, the lower pressure pad springs provide 858 N of force around the full perimeter at the initial position (e.g., initial material contact) and increases to 4,853 N when the tool is fully closed (but the edge not yet trimmed). In embodiments, the lower pressure pads 120 are guided with pins and bushings sized to accommodate side forces as the composite material (or fabric) 705 is pulled into the mold (e.g., between the core 115 and the cavity 505). In the edge trimming position, the upper pressure pads 110 compress to achieve the by-pass movement of the shearing edges. At the end of the forming step the pre-load forces on the core are 76,500 N. However, with this exemplary embodiment, when the upper pressure pads compress by 12 mm during the cutting step, the force increases to 92,500 N.

After forming and cutting the composite material, the upper die 105 is raised, and the formed part 705" is removed. Subsequently, the formed part 705" is subjected to a curing. The formed part 705" retains its shape well after being formed, and prior to curing. In embodiments, the formed part 705" may be immediately sent a curing process or may be stored for later curing. To account for any spring-back in the formed parts, in embodiments, the core 115 and cavity 505 may be configured, structured and/or arranged to form a shape slightly beyond the required contour to compensate for any relaxation (or spring-back) of the formed part 705" after removal from the tool 100.

System Environment

As will be appreciated by one skilled in the art, aspects of the present invention may be embodied as a system, a method or a computer program product. Accordingly, the present invention may take the form of an entirely hardware embodiment, or an embodiment combining software and hardware aspects that may all generally be referred to herein as a "circuit," "module" or "system." Furthermore, the aspects of embodiments of the present invention may take the form of a computer program product embodied in any tangible medium of expression having computer-usable program code tangibly embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet,
a magnetic storage device, and/or
a mobile device.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 11:
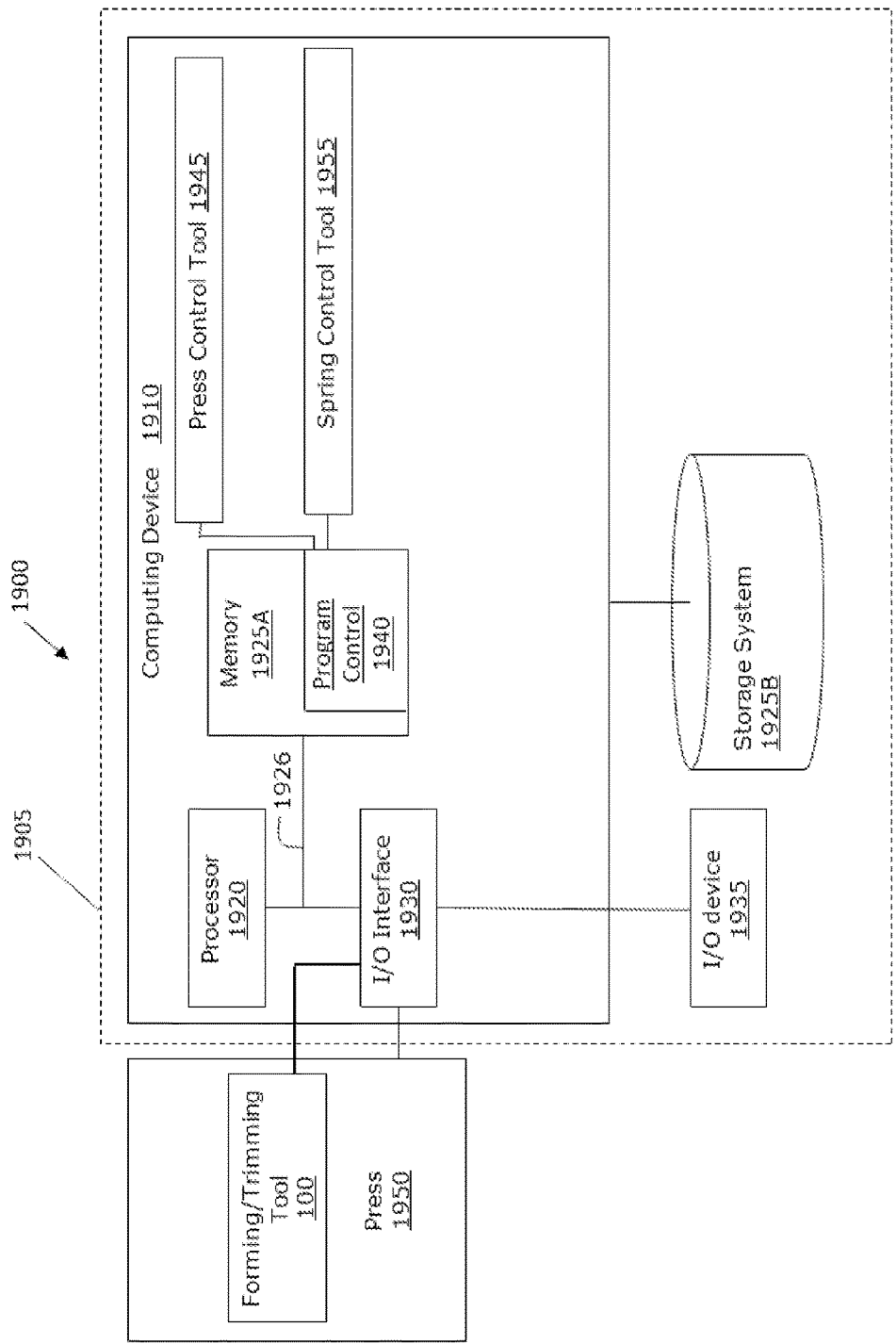
FIG. 11 shows an illustrative environment for managing the processes in accordance with embodiments of the invention.

FIG. 11 shows an illustrative environment 1900 for managing the processes in accordance with the invention. To this extent, the environment 1900 includes a server or other computing system 1905 that can perform the processes described herein. In particular, the server 1905 includes a computing device 1910. The computing device 1910 can be resident on a network infrastructure or computing device of a third party service provider (any of which is generally represented in FIG. 11).

In embodiments, the computing device 1910 includes a press control tool 1945 and a spring control tool 1955, which are operable to control a press 1950 and, in embodiments, control one or more spring tensions in the forming/trimming tool 100, e.g., the processes described herein. The press control tool 1945 and the spring control tool 1955 can be implemented as one or more program code in the program control 1940 stored in memory 1925A as separate or combined modules.

The computing device 1910 also includes a processor 1920, memory 1925A, an I/O interface 1930, and a bus 1926. The memory 1925A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (0/S).

The computing device 1910 is in communication with the external I/O device/resource 1935 and the storage system 1925B. For example, the I/O device 1935 can comprise any device that enables an individual to interact with the computing device 1910 or any device that enables the computing device 1910 to communicate with one or more other computing devices using any type of communications link. The external I/O device/resource 1935 may be for example, a handheld device, PDA, handset, keyboard, smartphone, etc. Additionally, in accordance with aspects of embodiments of the invention, the environment 1900 includes the forming/trimming tool 100 and the press 1950. In accordance with embodiments of the invention, the forming/trimming tool 100 is mounted in the press 1950 for operation.

In general, the processor 1920 executes computer program code (e.g., program control 1940), which can be stored in the memory 1925A and/or storage system 1925B. Moreover, in accordance with embodiments of the invention, the program control 1940 having program code controls the press control tool 1945 and, in embodiments, the spring control tool 1955. While executing the computer program code, the processor 1920 can read and/or write data to/from memory 1925A, storage system 1925B, and/or I/O interface 1930. The program code executes the processes of the invention. The bus 1926 provides a communications link between each of the components in the computing device 1910.

The computing device 1910 can comprise any general purpose computing article of manufacture capable of executing computer program code installed thereon (e.g., a personal computer, server, etc.). However, it is understood that the computing device 1910 is only representative of various possible equivalent computing devices that may perform the processes described herein. To this extent, in embodiments, the functionality provided by the computing device 1910 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 1905 is only illustrative of various types of computer infrastructures for implementing the invention. For example, in embodiments, the server 1905 comprises two or more computing devices (e.g., a server cluster) that communicate over any type of communications link, such as a network, a shared memory, or the like, to perform the process described herein. Further, while performing the processes described herein, one or more computing devices on the server 1905 can communicate with one or more other computing devices external to the server 1905 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagram

Figure 12:
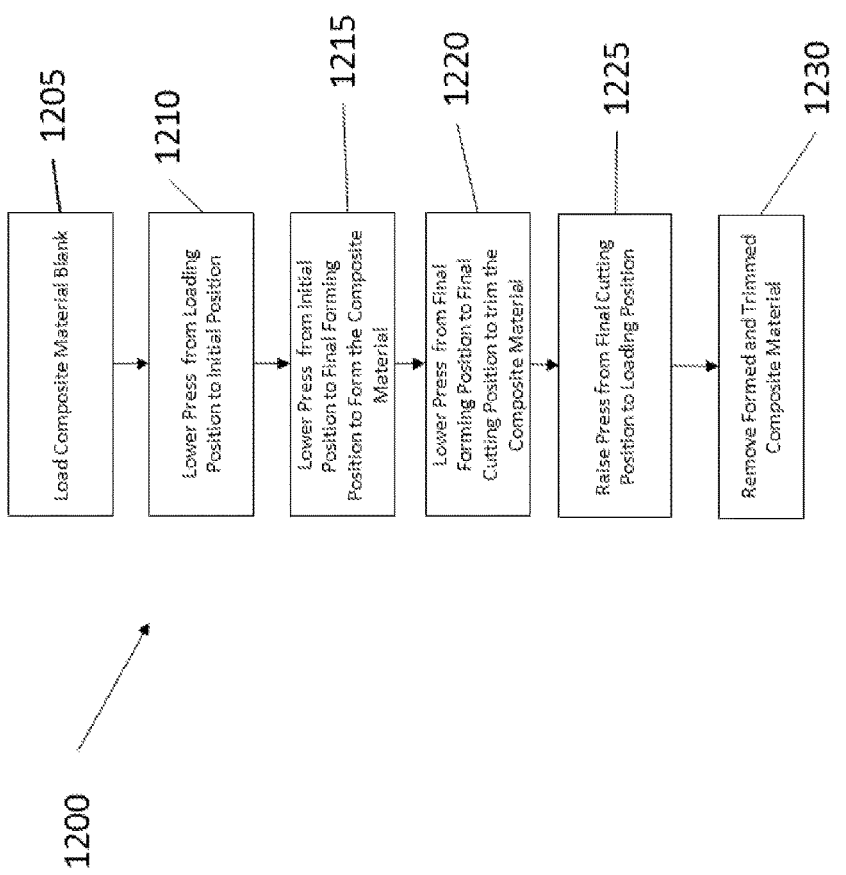
FIG. 12 shows an exemplary flow for performing aspects of embodiments of the present invention.

FIG. 12 shows an exemplary flow for performing aspects of embodiments of the present invention. The steps of FIG. 12 may be implemented in the environment of FIG. 11, for example. The flow diagram may equally represent a high-level block diagram of embodiments of the invention. The flowchart and/or block diagram in FIG. 12 illustrates the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, embodiments of the invention can take the form of a computer program product accessible from a computer-usable or computer-readable medium providing program code for use by or in connection with a computer or any instruction execution system. The software and/or computer program product can be implemented in the environment of FIG. 11. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 12 illustrates an exemplary flow 1200 for forming and trimming a composite material. At step 1205, a composite material blank is arranged in the forming/trimming tool. At step 1210, the press control tool lowers the press from the loading position to the initial position. At step 1215, the press control tool lowers the press from the initial position to the final forming position to form (or shape) the composite material. At step 1220, the press control tool lowers the press from final forming position to final cutting position to trim the composite material. At step 1225, the press control tool raises the press from the final cutting position to the loading position. At step 1230, the formed and trimmed composite material is removed from the forming/trimming tool.

While the invention has been described with reference to specific embodiments, those skilled in the art will understand that various changes may be made and equivalents may be substituted for elements thereof without departing from the true spirit and scope of the invention. In addition, modifications may be made without departing from the essential teachings of the invention.

The invention claimed is:

1. A forming and trimming tool operable to form and trim a composite material part, the forming and trimming tool comprising:
   a) a lower die having:
      i) a core mounted to the lower die;
      ii) at least one lower pressure pad mounted to the lower die and located about the core;
      iii) a cutter mounted to the lower die and located about the core, wherein the cutter includes a cutter shearing edge, and wherein the at least one lower pressure pad is structured to extend from the cutter;
      iv) a plurality of business mounted on the lower die; and
      v) a plurality of lower pressure pad springs located between the lower die and the at least one lower pressure pad which are structured and arranged to maintain the lower pressure pad in a load position while in a preloaded state;
   b) an upper die opposing the lower die and having:
      i) a cavity mounted to the upper die, wherein the cavity includes a cavity shearing edge;
      ii) at least one upper pressure pad mounted to the upper die and about the cavity, wherein the at least one upper pressure pad is opposite of and faces toward the at least one lower pressure pad, and wherein the at least one upper pressure pad is moveable toward the at least one lower pressure pad to generate a clamping force together with the at least one lower pressure pad;
      iii) a plurality of alignment pins mounted on the upper die; and
   wherein the cavity shearing edge is configured to move past the cutter shearing edge to trim the composite material part, wherein the plurality of bushings are structured and arranged to receive the plurality of alignment pins, respectively, to provide alignment of the core and the cavity; and wherein the composite material part is formed from a composite material which is a prepreg of a thermoset resin and a carbon fiber.

2. The forming and trimming tool of claim 1, further comprising:
a plurality of upper stop blocks mounted to the upper die; and
a plurality of lower stop blocks mounted to the lower die.

3. The forming and trimming tool of claim 1, wherein the core and the cavity comprise substantially reciprocal shapes corresponding to a desired shape of the composite material part.

4. The forming and trimming tool of claim 1, wherein the at least one lower pressure pad comprises a plurality of lower pressure pads.

5. The forming and trimming tool of claim 1, further comprising at least one mount structured and arranged to support the at least one lower pressure pad.

6. The forming and trimming tool of claim 1, further comprising a plurality of upper pressure pad springs and a plurality of at least one of core springs and nitrogen cylinders.

7. The forming and trimming tool of claim 6, wherein the plurality of lower pressure pad springs, the plurality of upper pressure pad springs, and a plurality of core springs are structured and arranged such that upon a downward vertical movement of the upper die towards the lower die, and an resulting increase of applied pressure, the plurality of lower pressure pad springs begin to compress first, the plurality of upper pressure pad springs compress after the plurality of lower pressure pad springs finish compressing, and the plurality of core springs compress after the plurality of upper pressure pad springs finish compressing.

8. The forming and trimming tool of claim 1, wherein the upper die is structured and arranged for vertical movement relative to the lower die.

9. The forming and trimming tool of claim 8, wherein upon a downward vertical movement of the upper die towards the lower die, the at least one upper pressure pad is moved towards the at least one lower pressure pad to provide a clamping force to a composite material blank.

10. The forming and trimming tool of claim 9, wherein upon a further downward vertical movement of the upper die towards the lower die, the cavity is moved towards the core to shape the composite material part from the composite material blank.

11. The forming and trimming tool of claim 10, wherein upon a yet further downward vertical movement of the upper die towards the lower die, the cavity shearing edge of the cavity is moved past the cutter shearing edge of the cutter to trim the composite material blank.

12. The forming and trimming tool of claim 9, wherein the clamping force is configured to clamp a perimeter region of the composite material blank with a sufficient force during a forming operation and during a trimming operation.

13. The forming and trimming tool of claim 12, wherein the sufficient force is large enough to prevent wrinkling of the composite material blank, but small enough to prevent tearing of the composite material blank, while allowing for controlled sliding of the composite material blank.

14. The forming and trimming tool of claim 9, wherein the clamping force applied to the composite material blank dynamically increases with a downward vertical movement of the upper die towards the lower die.

15. The forming and trimming tool of claim 1 in combination with a press structured and arranged to provide vertical movement of the upper die relative to the lower die.

16. The forming and trimming tool of claim 15, wherein a stroke of the press is continuous through a composite material holding and control stage, a composite material forming stage; and a composite material edge trimming stage.

17. The forming and trimming tool of claim 1, wherein the at least one upper pressure pad and the at least one lower pressure pad comprise steel.

* * * * *